(12) United States Patent
Maguire et al.

(10) Patent No.: US 10,582,392 B2
(45) Date of Patent: Mar. 3, 2020

(54) REALLOCATING A CAPACITY BOOST CELL OF A CELLULAR NETWORK

(71) Applicant: Telefonaktiebolaget LM Ericsson (publ), Stockholm (SE)

(72) Inventors: Patrick Maguire, Athlone (IE); Jimmy O'Meara, Athlone (IE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/744,757

(22) PCT Filed: Jul. 15, 2015

(86) PCT No.: PCT/EP2015/066209
§ 371 (c)(1),
(2) Date: Jan. 12, 2018

(87) PCT Pub. No.: WO2017/008852
PCT Pub. Date: Jan. 19, 2017

(65) Prior Publication Data
US 2018/0206125 A1    Jul. 19, 2018

(51) Int. Cl.
*H04W 16/06* (2009.01)
*H04W 24/02* (2009.01)
*H04W 28/08* (2009.01)

(52) U.S. Cl.
CPC ........... *H04W 16/06* (2013.01); *H04W 24/02* (2013.01); *H04W 28/08* (2013.01)

(58) Field of Classification Search
CPC ...... H04W 16/06; H04W 28/08; H04W 24/02
See application file for complete search history.

(56) References Cited

U.S. PATENT DOCUMENTS

2006/0079241 A1\* 4/2006 Faccin .................. H04W 36/18
455/450
2011/0009145 A1 1/2011 Pirinen
(Continued)

FOREIGN PATENT DOCUMENTS

| EP | 2688348 A1 | 1/2014 |
| WO | 2012141628 A1 | 10/2012 |
| WO | 2015071704 A1 | 5/2015 |

OTHER PUBLICATIONS

PCT International Search Report, dated Apr. 26, 2016, in connection with International Application No. PCT/EP2015/066209, all pages.
(Continued)

*Primary Examiner* — Andrew Lai
*Assistant Examiner* — Harry H Kim
(74) *Attorney, Agent, or Firm* — Patent Portfolio Builders, PLLC

(57) ABSTRACT

Reallocation of a capacity boost cell between first and second operators in a cellular radio communications network is carried out by detecting a drop in load for the first operator, in the area of coverage of the capacity boost cell, below a first threshold, and reallocating automatically the capacity boost cell to the second operator in response to the detected drop in load, if the first operator has authorised a reallocation. The capacity boost cell can be reallocated automatically back to the first operator in response to detecting a subsequent increase in load above a second threshold for the first operator. This can improve utilisation of the capacity boost cell during low load periods while still having it available for the first operator for high load periods, and can provide access to additional capacity for the second operator without need for costly additional infrastructure.

16 Claims, 11 Drawing Sheets

(56) References Cited

U.S. PATENT DOCUMENTS

| | | | |
|---|---|---|---|
| 2013/0155991 A1* | 6/2013 | Kazmi | H04W 72/0453 |
| | | | 370/329 |
| 2014/0023016 A1 | 1/2014 | Mildh et al. | |
| 2014/0148165 A1* | 5/2014 | Serravalle | H04W 16/14 |
| | | | 455/436 |
| 2014/0170965 A1* | 6/2014 | Li | H04W 28/08 |
| | | | 455/7 |
| 2015/0173100 A1* | 6/2015 | Aydin | H04W 72/0426 |
| | | | 370/329 |

OTHER PUBLICATIONS

PCT Written Opinion, dated Apr. 26, 2016, in connection with International Application No. PCT/EP2015/066209, all pages.
Office Action issued in application No. 15739251.5; dated Jun. 4, 2018; 04 pages.

* cited by examiner

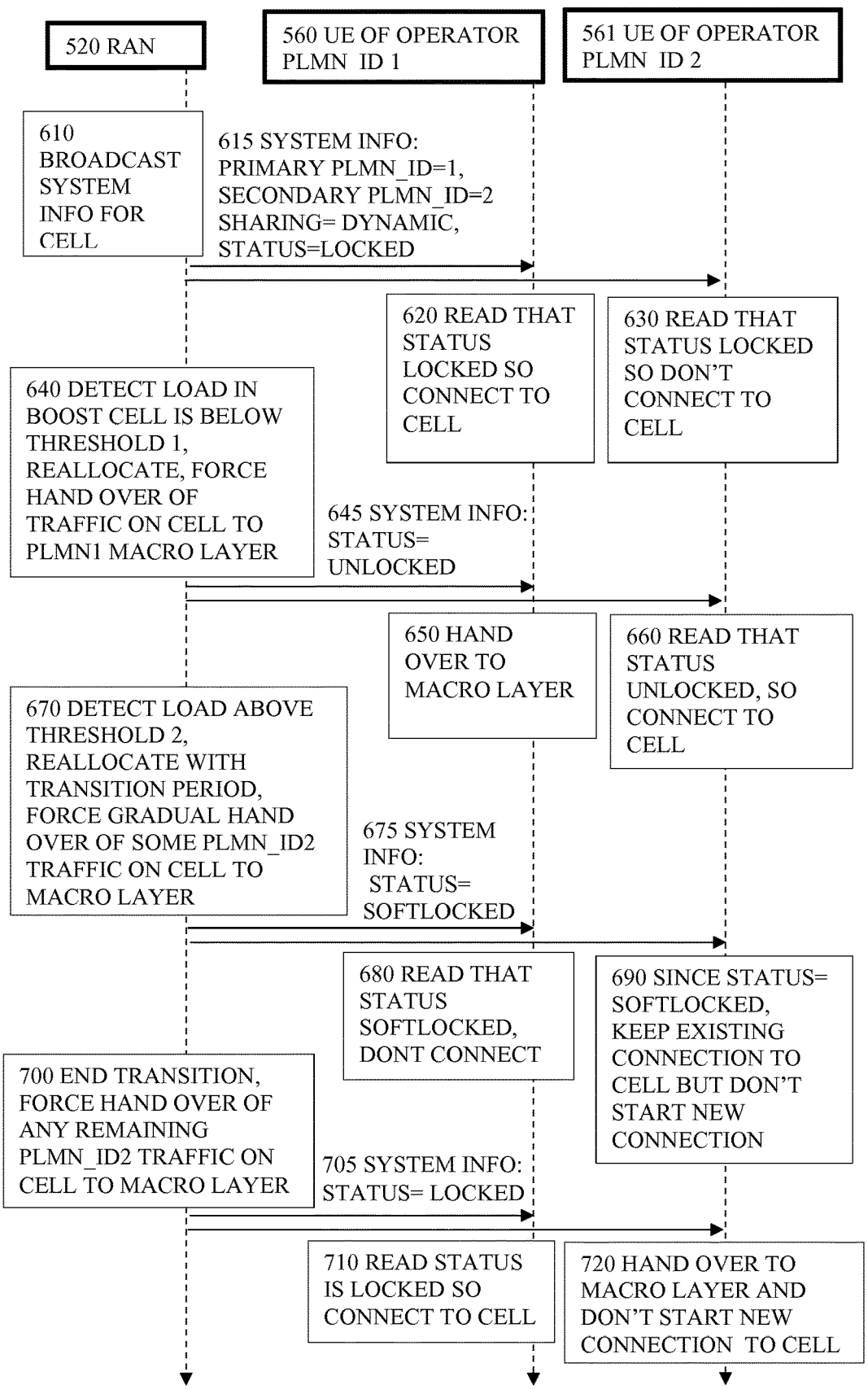

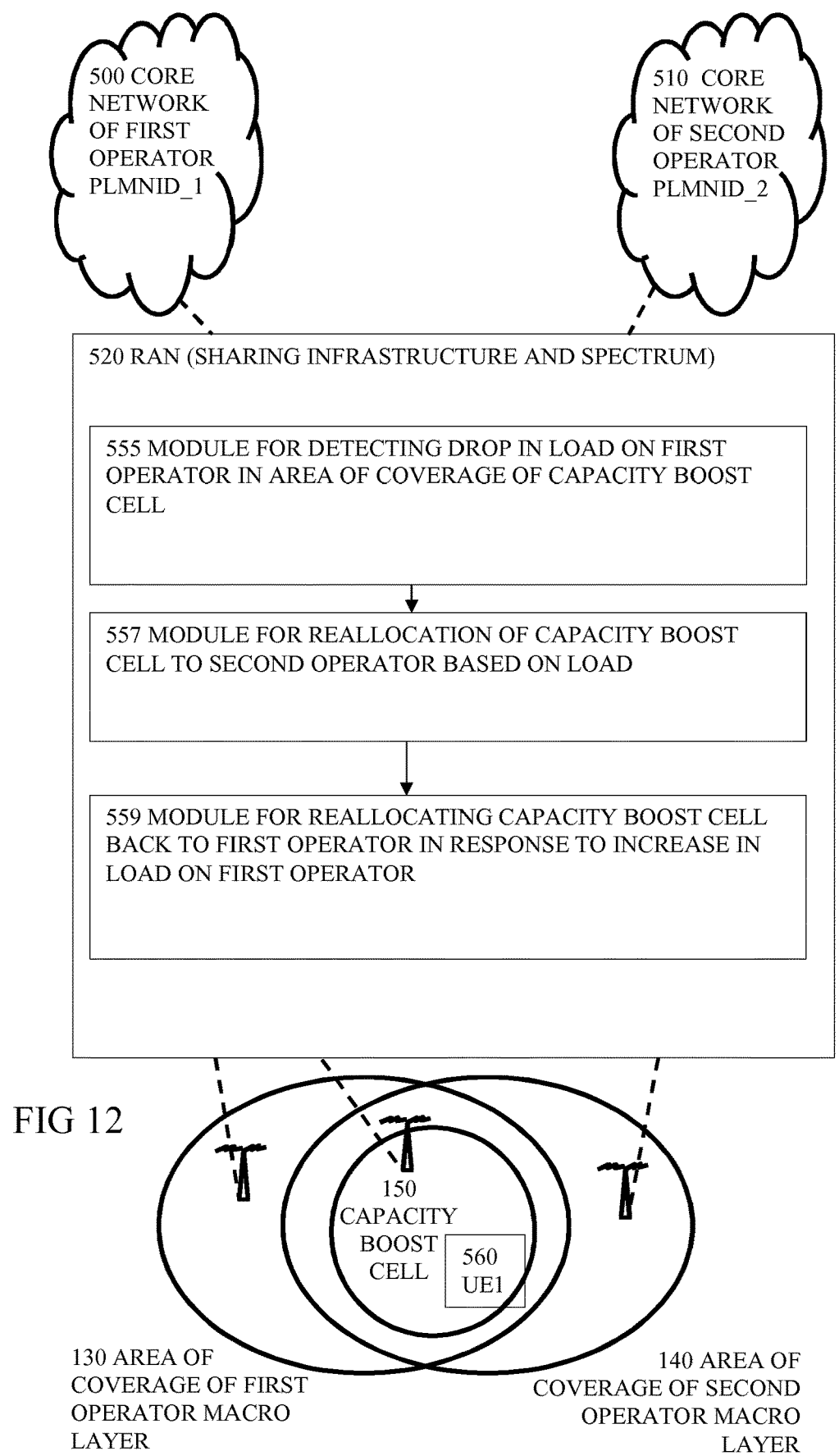

REALLOCATING A CAPACITY BOOST CELL OF A CELLULAR NETWORK

TECHNICAL FIELD

The present invention relates to methods of reallocating a capacity boost cell between operators sharing a carrier in a cellular communications network, to corresponding apparatus for such methods, to radio access networks for such methods and to corresponding programs for such methods.

BACKGROUND

It is known to have different operators providing wireless mobile service to subscribers with overlapping coverage. There are a number of ways for operators to invest in spectrum and infrastructure to provide more capacity or more coverage. An operator can for example:
Invest in spectrum & infrastructure;
Invest in spectrum & share infrastructure CAPEX with another operator;
Share CAPEX in spectrum & infrastructure with another operator;
Operate as a Virtual Mobile Network Operator, i.e. lease spectrum from one of the above.

It is known to share resources between operators, as shown in US2014023016, which explains that one network sharing configuration which may be considered is the so called Multi-Operator Random Access Network (MORAN) configuration where operators share the physical network equipment but do not share the spectrum, i.e. each operator uses different carriers. The advantage with the MORAN configuration is that each operator has full control over the configuration of broadcast parameters used in their spectrum, giving more freedom to have operator specific configurations. The drawback however is that the operators are not able to benefit from spectrum sharing leading to lower utilization of radio resource and lower network capacity. US2014023016 proposes a way of overcoming this restriction and sharing carriers in a MORAN configuration by using carrier aggregation, and by sending a resource configuration message to a UE to enable it to configure another carrier as a secondary component carrier.

It is also known to provide spectrum sharing within the same carrier, as well as sharing network infrastructure and sites. This can reduce the total deployment costs, and may further provide benefits due to pooling of the available spectrum. A drawback is that it requires significant cooperation between the operators sharing the network since the network configuration is common for the part of the network that is shared, making it difficult to differentiate the treatment of users from each operator. This also makes interaction, e.g. handover, between shared parts and non-shared parts more complex, since the shared part needs to interact with a multiple of non-shared networks.

Support for such network sharing has recently been enhanced in the third Generation Partnership Project (3GPP) Universal Terrestrial Radio Access Network (UTRAN) and Evolved-UTRAN standards. The standards allow various scenarios for network sharing, but it is expected that a common scenario will be when the Radio Access Network (RAN) is shared and each operator has its own Core Network (CN). This scenario is called Multi-Operator Core Network (MOCN) in 3GPP. From a technical point of view the MOCN configuration uses the multi-to-multi connectivity of the interfaces between the Radio Network Controller (RNC) and CN, and the evolved Node B (eNB) and the CN, respectively. This makes it possible to connect a Radio Access Network (RAN) node, e.g. RNC or eNB, to multiple CN nodes, e.g. Serving General Packet Radio Service Support Node and Mobile Management Entity (MME), belonging to different operators. The RAN will in this configuration broadcast one Public Land Mobile Network (PLMN) identity for each operator sharing the RAN. The UE will at initial attach select which PLMN it wants to connect to and the RAN will make sure that the initial attach signalling is routed to the correct operators CN. Once the UE has been assigned a CN node there are also mechanisms making it possible for the RAN and CN to route subsequent signalling related to this UE to the same CN node. Besides the list of PLMN IDs, most system information broadcasted on the cell broadcast channels in the shared RAN is common for all operators sharing the RAN. Capacity boost cells (also called small cells) can be added by each operator to increase capacity, using the same carrier. A UE subscribing to one operator checks the system information broadcast from the cell to see if it belongs to the same operator and is therefore available to connect to.

With ever increasing capacity demands there continues to be a growing variation between peak demand and outside busy hour needs. However, operators are forced to dimension for peak demands, resulting in poor use of network resources (spectrum & infrastructure) during off-peak times. As operators focus on different service offerings targeting different business segments, one operator's needs (spectrum & infrastructure) at different times and locations may vary greatly from another and this variation will continue to grow as networks evolve towards 5G. None of the above deployment scenarios enable an operator to optimize their ROI in this situation.

SUMMARY

Embodiments of the invention provide improved methods and apparatus. According to a first aspect of the invention, there is provided a method of reallocating a capacity boost cell between first and second operators in a cellular radio communications network, the first and second operators having respective areas of coverage sharing the same carrier and overlapping with a coverage of the capacity boost cell. The method has steps of, while the capacity boost cell is allocated to the first operator, detecting a drop in load for the first operator, in the area of coverage of the capacity boost cell, below a first threshold, and reallocating automatically the capacity boost cell to the second operator in response to the detected drop in load, if the first operator has authorised a reallocation. There is also a step of reallocating automatically the capacity boost cell to the first operator in response to detecting a subsequent increase in load above a second threshold for the first operator in the area of coverage overlapping with that capacity boost cell.

An effect of such dynamic reallocation is to improve utilisation of the capacity boost cell during low load periods while still having it available for the first operator for high load periods. This can provide a further revenue stream for the first operator while maintaining service and coverage for its own subscribers. For the second operator this can provide access to additional capacity in a dynamic automated way, without need for costly infrastructure investment. This is particularly useful for operators having specialised users (e.g. remote monitoring) causing peaks in load at different times or places compared to other operators.

Any additional features can be added, or disclaimed, and some are described below and set out in dependent claims.

One such additional feature is the step of reallocating to the first operator comprising a transition period when new requests for resources of the capacity boost cell from user equipments of the second operator are not allowed, but resources already in use by user equipments of the second operator are allowed to remain in use. Another such additional feature is a step of forcing some of the resources already in use during the transition period to be relinquished before the end of the transition period. Another such additional feature is the first operator comprising a primary operator having control of the reallocation, and the reallocations being carried out without seeking authorization from another operator.

Another such additional feature is the reallocating steps each or either comprising adapting system information for the capacity boost cell to comprise an indication of the reallocations between the operators and broadcasting the adapted system information to user equipments. Another such additional feature is the indication in the system information representing whether dynamic reallocation is available or not for that capacity boost cell. Another such additional feature is the indication in the system information representing a current status of the reallocation in terms of availability of the capacity boost cell to the second operator. Another such additional feature is carrying out the method at a radio access network.

Another aspect of the invention provides a computer program configured to perform, when run on a computer, the method of any of the above combinations of features. The computer program can be stored on a computer readable material. Another aspect of the invention provides apparatus for reallocating a capacity boost cell between first and second operators in a cellular radio communications network, the first and second operators having respective areas of coverage sharing the same carrier and overlapping with a coverage of the capacity boost cell. The apparatus also comprises a processing circuit and a memory circuit, the memory circuit having instructions executable by the processing circuit, wherein said processing circuit when executing the instructions is configured to: while the capacity boost cell is allocated to the first operator, detect a drop in load for the first operator, in the area of coverage of the capacity boost cell, below a first threshold. It is also configure to reallocate automatically the capacity boost cell to the second operator in response to the detected drop in load, if the first operator has authorised a reallocation, and reallocate automatically the capacity boost cell to the first operator in response to detecting a subsequent increase in load above a second threshold for the first operator in the area of coverage overlapping with that capacity boost cell.

Another such additional apparatus feature is the processing circuit being configured such that the reallocating to the first operator comprises a transition period when new requests for resources of the capacity boost cell from user equipments of the second operator are not allowed, but resources already in use by user equipments of the second operator are allowed to remain in use. Another such additional feature is the processing circuit being configured to force some of the resources already in use during the transition period to be relinquished before the end of the transition period. Another such additional feature is the first operator comprising a primary operator having control of the reallocation, and the processing circuit being configured to carry out the reallocation under the control of the primary operator without seeking authorization from another operator.

Another such additional feature is the processing circuit being configured to carry out the reallocation by adapting system information for the capacity boost cell and to broadcast the adapted system information to user equipments, the adapted system information comprising an indication of the reallocations between the operators. Another such additional feature is the processing circuit being configured to adapt the indication in the system information to represent whether dynamic reallocation is available or not for that capacity boost cell. Another such additional feature is the processing circuit being configured to adapt the indication in the system information to represent a current status of the reallocation in terms of availability of the capacity boost cell to the second operator.

Another aspect provides apparatus for reallocating a capacity boost cell between first and second operators in a cellular radio communications network, the first and second operators having respective areas of coverage sharing the same carrier and overlapping with a coverage of the capacity boost cell, the apparatus having a module for detecting, while the capacity boost cell is allocated to the first operator, a drop in load for the first operator, in the area of coverage of the capacity boost cell, below a first threshold. The apparatus also has a module for reallocating automatically the capacity boost cell to the second operator in response to the detected drop in load, if the first operator has authorised a reallocation, and a module for reallocating automatically the capacity boost cell to the first operator, in response to detecting a subsequent increase in load above a second threshold for the first operator in the area of coverage overlapping with that capacity boost cell.

An additional apparatus feature is the module for reallocating to the first operator being configured to provide a transition period when new requests for resources of the capacity boost cell from user equipments of the second operator are not allowed, but resources already in use by user equipments of the second operator are allowed to remain in use. Another such additional feature is the module for reallocating to the first operator being configured to force some of the resources already in use during the transition period to be relinquished before the end of the transition period. Another such additional feature is the first operator comprising a primary operator having control of the reallocation, and the module for reallocating being configured to carry out the reallocation under the control of the primary operator without seeking authorization from another operator. Another such additional feature is the module for reallocating being configured to carry out the reallocation by adapting system information for the capacity boost cell and by broadcasting to user equipments the adapted system information comprising an indication of the reallocations between the operators. Another such additional feature is the module for reallocating being configured to adapt the indication in the system information to represent whether dynamic reallocation is available or not for that capacity boost cell. Another such additional feature is the processing circuit being configured to adapt the indication in the system information to represent a current status of the reallocation in terms of availability of the capacity boost cell to the second operator. Another aspect provides a radio access network node having the apparatus of any of the combinations of features set out above.

Another aspect provides a method of operating a user equipment with a cellular radio communications network having the apparatus as set out above, when the user equipment is in the area of coverage of the capacity boost cell, and the user equipment is subscribed to the second operator, the method having steps of receiving broadcast system information relating to the capacity boost cell, the system information having an indication of the status of availability of the capacity boost cell, and determining whether to use the capacity boost cell based on detecting from the received system information if the capacity boost cell is available to user equipments of the second operator. It is also based on detecting from the received system information if the capacity boost cell is in a transition period when it can maintain existing connections but not establish new connections with user equipments of the second operator.

Another aspect provides a computer program configured to, when run on a computer in the user equipment, perform this method.

Another aspect provides user equipment suitable for operation with a cellular radio communications network having the apparatus for reallocating as set out above, and having a processing circuit and a memory circuit, the memory circuit having instructions executable by the processor circuit, wherein said processing circuit when executing the instructions is configured to: receive broadcast system information relating to the capacity boost cell, the system information having an indication of the status of availability of the capacity boost cell. It is also configured to determine whether to use the capacity boost cell based on detecting from the received system information if the capacity boost cell is available to user equipments of the second operator, and based on detecting from the received system information if the capacity boost cell is in a transition period when it can maintain existing connections but not establish new connections with user equipments of the second operator.

Any of the additional features can be combined together and combined with any of the aspects. Other effects and consequences will be apparent to those skilled in the art, especially over compared to other prior art. Numerous variations and modifications can be made without departing from the claims of the present invention.

BRIEF DESCRIPTION OF THE DRAWINGS

How the present invention may be put into effect will now be described by way of example with reference to the appended drawings, in which:

FIG. 11 shows a time chart of actions of RAN and UEs according to an embodiment, and FIG. 12 shows apparatus having modules for reallocation according to an embodiment.

DETAILED DESCRIPTION

Figure 1:
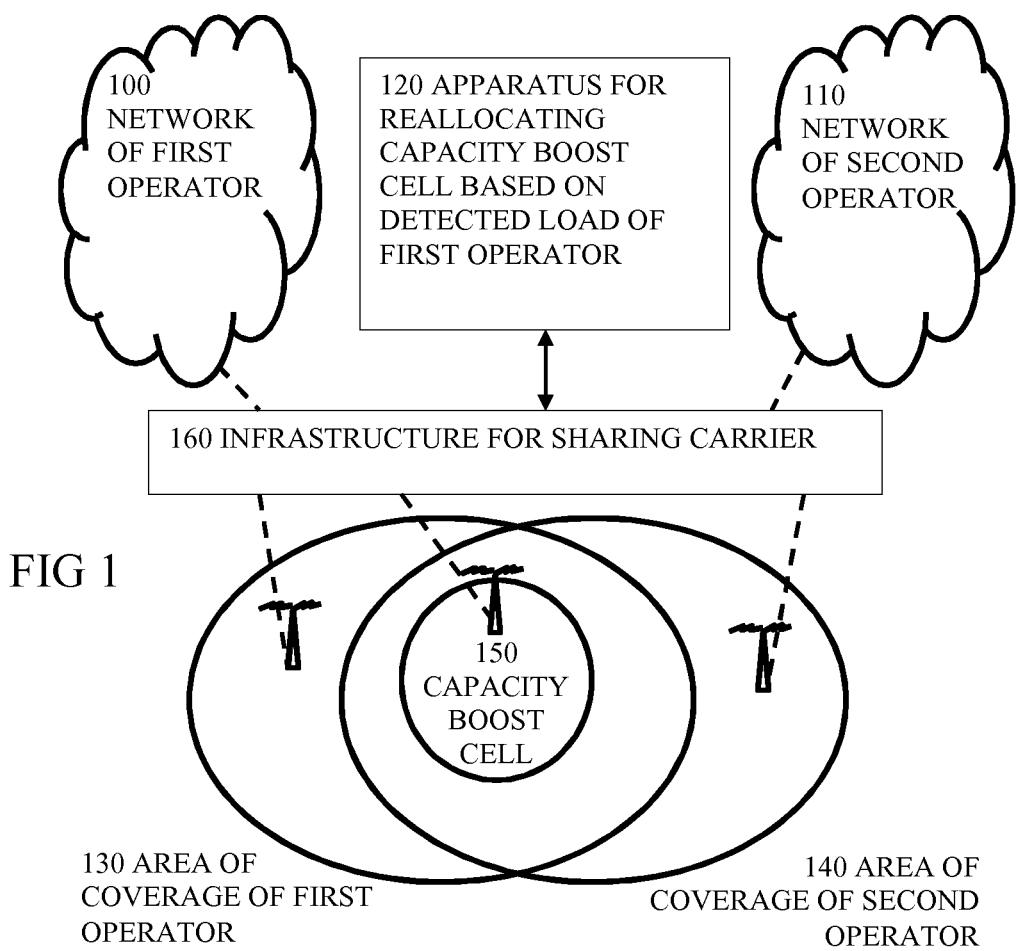
FIG. 1 shows a schematic view of networks and areas of coverage according to a first embodiment.

The present invention will be described with respect to particular embodiments and with reference to certain drawings but the scope of the invention is not limited thereto. The drawings described are only schematic and are non-limiting. In the drawings, the size of some of the elements may be exaggerated and not drawn to scale for illustrative purposes.

Definitions:

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

References to software or programs can encompass any type of programs in any language executable directly or indirectly on processing hardware.

References to processing circuitry, hardware, processing hardware or circuitry can encompass any kind of logic or analog circuitry, integrated to any degree, and not limited to general purpose processors, digital signal processors, ASICs, FPGAs, discrete components or logic and so on.

References to a processing circuit are intended to encompass implementations using multiple processing circuits which may be integrated together, or co-located in the same node or distributed at different locations for example.

References to a cell are intended to encompass any kind of cell of any kind of cellular radio communications network.

References to capacity boost in relation to a cell are intended to encompass any kind of increase of capacity, over and above a basic or macro layer capacity in the same area of coverage, so that the coverage is not lost when the capacity boost cell is not used.

References to operator are intended to encompass an organization for operating a network.

References to reallocating are intended to encompass any kind of allocating of a cell to make it available to the UEs of subscribers of a particular operator or operators.

Abbreviations

ASIC Application Specific Integrated Circuit
CAPEX Capital Expenditure
CN Core Network
eNB evolved Node B
FPGA Field Programmable Gate Array
LTE Long Term Evolution
MME Mobile Management Entity
MOCN Multi-Operator Core Network
MORAN Multi-Operator Random Access Network
PLMN Public Land Mobile Network
RAN Radio Access Network
RNC Radio Network Controller
ROI Return on investment
UE User equipment
UTRAN Universal Terrestrial Radio Access Network WCDMA Wideband Code Division Access
3GPP 3rd Generation Partnership Project Introduction By way of introduction to the embodiments, some issues with conventional networks will be explained. In order to meet the ever growing demands by subscribers for wireless capacity, operators are forced to invest heavily in radio infrastructure which at off peak times will not be fully utilized. In many scenarios, operators occupy the same coverage area. Embodiments of the invention as described can offer a solution to an operator (for example a secondary, virtual or non-virtual operator) who potentially does not wish to invest as much in infrastructure but can access licensed spectrum of another operator (Primary/Home) who does not need it based on real-time load measurements in Primary operators network. It is of interest particularly when applied to a system supporting MOON in a deployment which has capacity boost cells as an overlaid coverage overlaid over a macro layer, and it is the capacity boost cells which are shared dynamically.

FIG. 1, Schematic View of Networks and Areas of Coverage According to a First Embodiment FIG. 1 shows a schematic view of an embodiment showing a coverage area of a capacity boost cell 150, overlapping with areas 130, 140 of coverage of a first operator and a second operator respectively where they share the same carrier, for example in a MOON arrangement. There is infrastructure 160 for sharing the carrier, typically realised as a radio access network, and apparatus 120 for reallocating the capacity boost cell automatically based on detected load of the first operator at the capacity boost cell. In principle this apparatus can be located anywhere, but in practice it is convenient to have it incorporated in a radio access network, so that communication overhead and delay is minimised.

Figure 2:
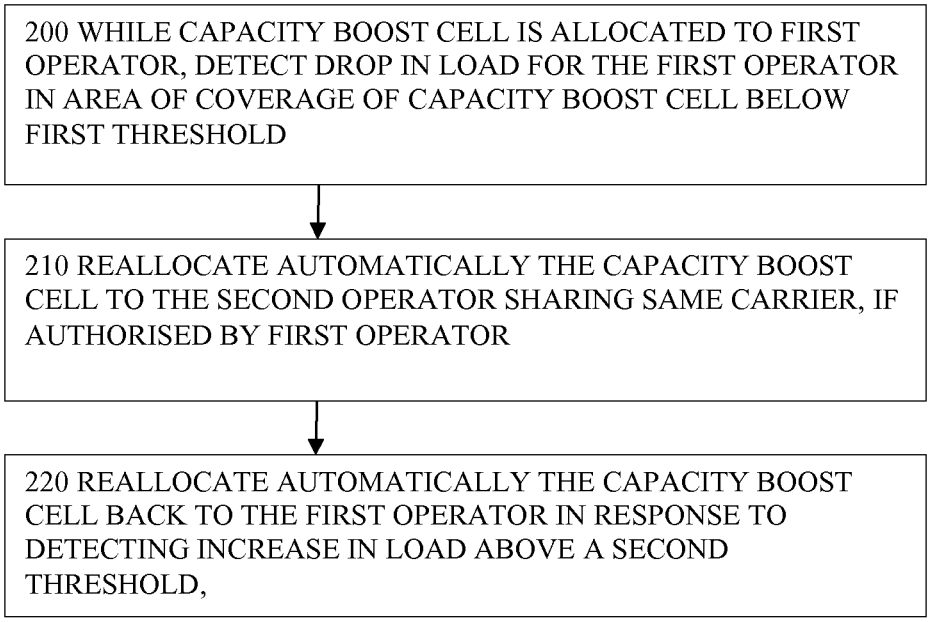
FIG. 2 shows steps of a method of reallocation according to an embodiment.

FIG. 2, Steps of a Method of Reallocation According to an Embodiment

FIG. 2 shows steps of a method of operation of the apparatus 120 of FIG. 1, or of a node radio access network or other embodiment. At step 200, while the capacity boost cell is allocated to the first operator, any drop in load on the first operator, at the capacity boost cell, below a first threshold is detected. At step 210, there is a step of reallocating automatically the capacity boost cell to the second operator sharing the same carrier, provided the first operator has authorised the reallocation. At step 220, in response to detecting an increase in the load on the first operator in the same area of coverage as the capacity boost cell, above a second threshold, there is a step of reallocating the capacity boost cell back to the first operator. These steps can be implemented in various ways and be incorporated with other steps, and some examples of this will be described.

Such dynamic reallocation, compared to manual allocation by agreement between operators, can improve utilisation of the capacity boost cell during low load periods while still having it available for the first operator for high load periods. This can provide a further revenue stream for the first operator while maintaining service and coverage for its own subscribers. For the second operator this can provide access to additional capacity in a dynamic automated way, without need for costly infrastructure investment. This is particularly useful for operators having specialised users (e.g. remote monitoring) causing peaks in load at different times or places compared to other operators. The first and second thresholds could be set to fixed levels or be adapted dynamically for example to have different levels at different times of day and different locations according a historical traffic profile for that operator. There could be a hysteresis period to restrict rapid oscillation between reallocations, and this hysteresis could also be adapted dynamically.

Figure 3:
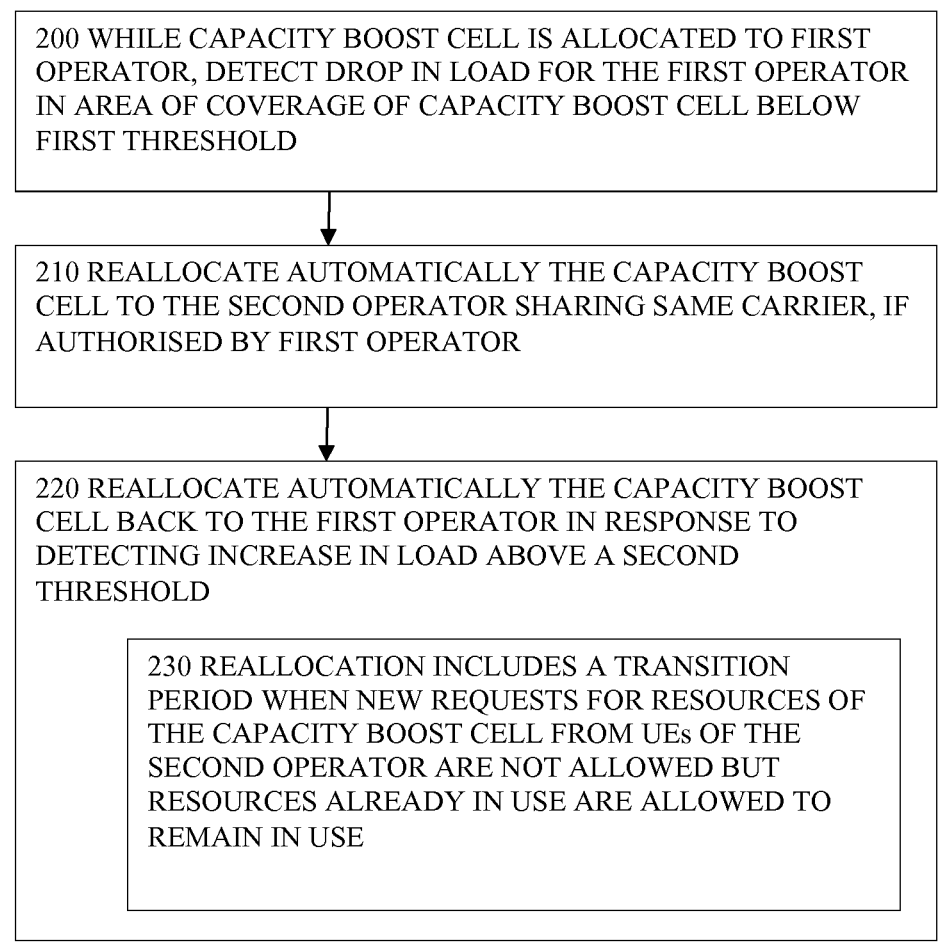
FIG. 3 shows steps of a method according to an embodiment having a transition period.

FIG. 3, Steps of a Method According to an Embodiment Having a Transition Period

FIG. 3 shows steps of a method of operation similar to that of FIG. 2 and corresponding reference numerals have been used as appropriate. An additional feature is that the step 220 of reallocating to the first operator comprises a transition period 230 when new requests for resources of the capacity boost cell from user equipments of the second operator are not allowed, but resources already in use by user equipments of the second operator are allowed to remain in use. This can provide a reduced risk of undesired dropping of a connection and so a better user experience of the communication. Other additional features as described below can be combined with this embodiment.

Figure 4:
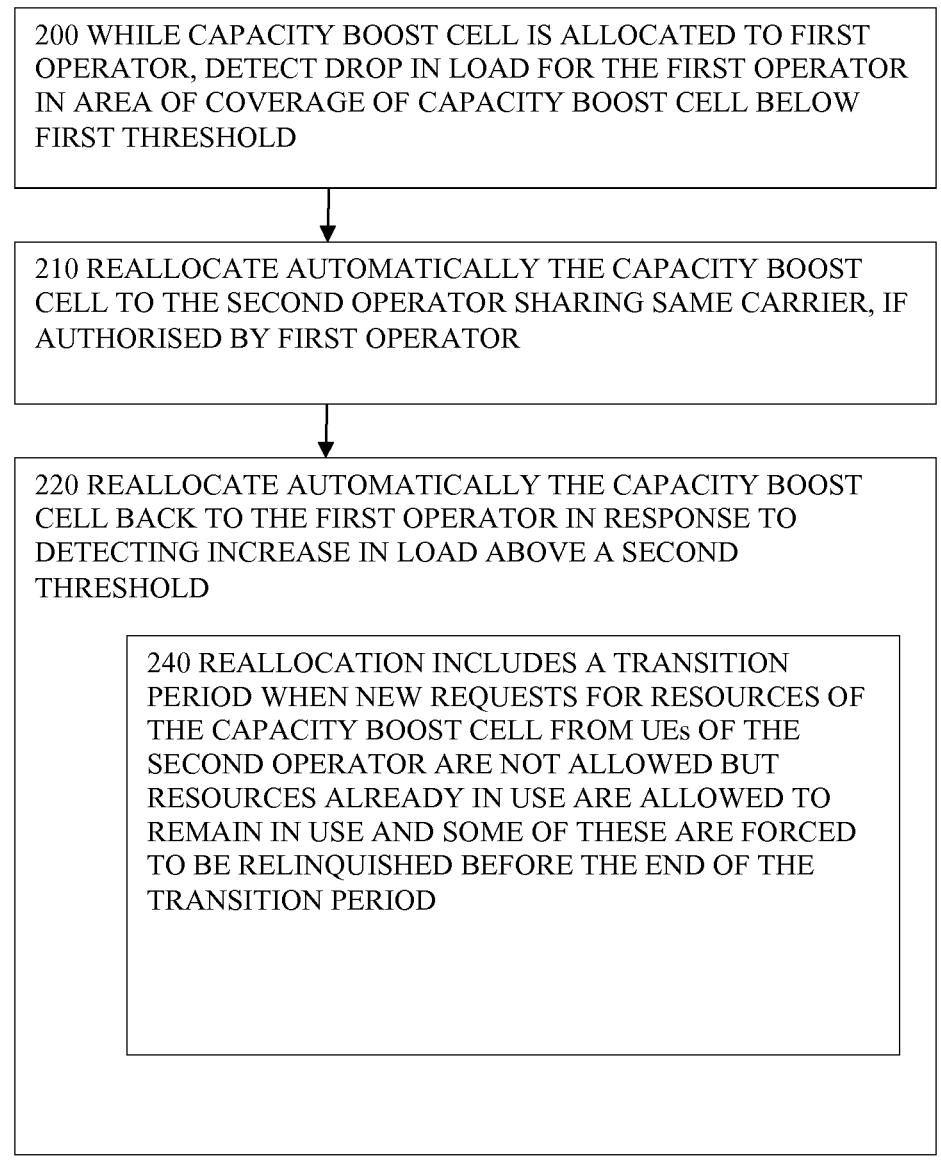
FIG. 4 shows steps of a method according to an embodiment having forced handover during the transition period

FIG. 4, Steps of a Method According to an Embodiment Having Forced Handover During the Transition Period FIG. 4 shows steps of a method of operation similar to that of FIG. 2 and corresponding reference numerals have been used as appropriate. An additional feature in the reallocation 220 back to the first operator is a step 240 of forcing some of the resources already in use during the transition period to be relinquished before the end of the transition period. This can help to spread out a possible peak in handovers to other cells of the second operator, so leading to a reduced risk of undesired dropping of a connection. Other additional features as described below can be combined with this embodiment.

Figure 5:
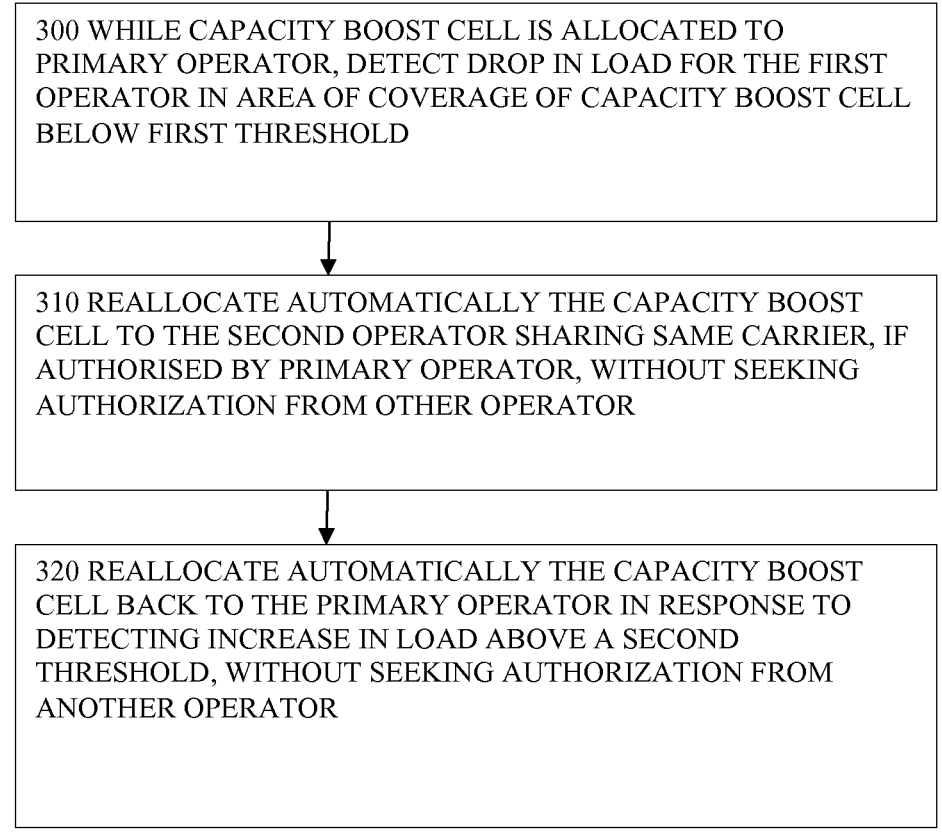
FIG. 5 shows steps of a method according to an embodiment in which first operator is primary operator.

FIG. 5, Steps of a Method According to an Embodiment in Which First Operator is Primary Operator FIG. 5 shows steps of a method of operation similar to that of FIG. 2. Notably, the first operator is now a primary operator, in the sense that they have control of the reallocation of the capacity boost cell to and from the second operator. This contrasts with the alternative possibility that the first operator is another secondary operator, in which case the first operator would need to request the primary operator to carry out the reallocation. At step 300, while the capacity boost cell is allocated to the first operator, any drop in load on the primary operator, at the capacity boost cell, below a first threshold is detected. At step 310, there is a step of reallocating automatically the capacity boost cell to the second operator sharing the same carrier, provided the primary operator has authorised the reallocation. At step 320, there is a step of reallocating the capacity boost cell back to the primary operator in response to detecting an increase in the load on the primary operator in the same area of coverage as the capacity boost cell, above a second threshold. Since the first operator is the primary operator having control of the reallocation, the reallocations are carried out without seeking authorization from another operator. Thus the primary operator has control of cell reallocation so can carry out reallocation directly, without a need to request primary operator carry out the reallocation. Other additional features as described below can be combined with this embodiment.

Figure 6:
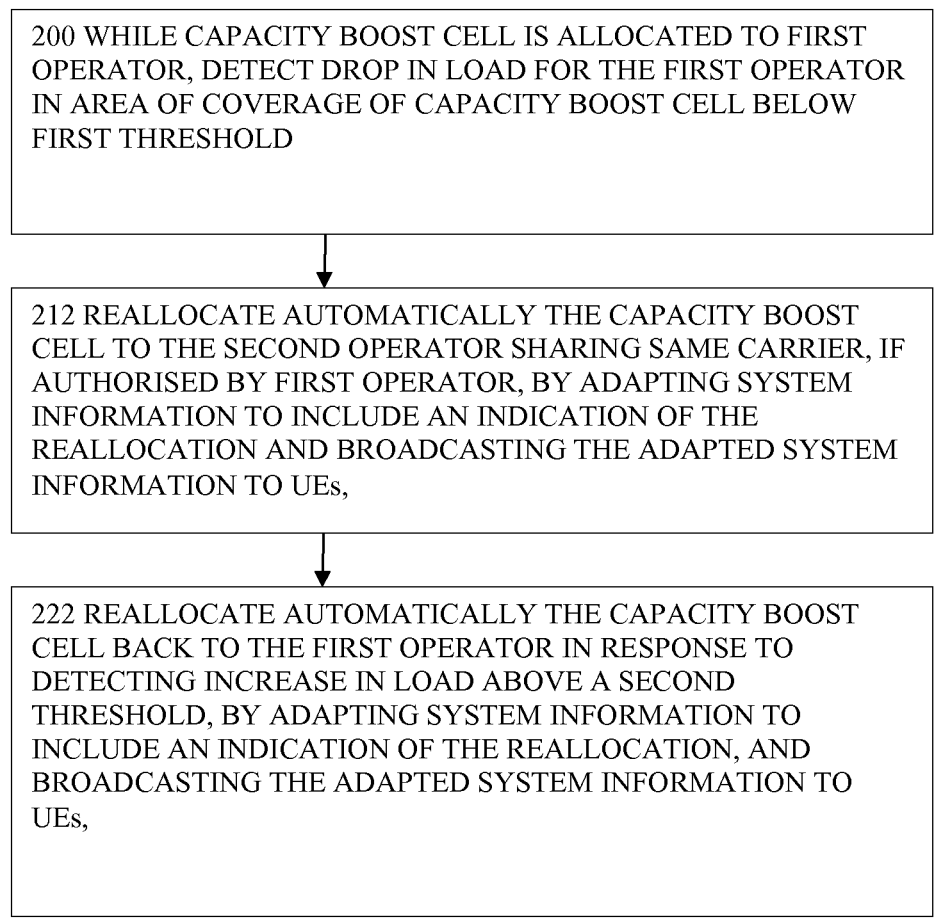
FIG. 6 shows steps of a method according to an embodiment in which reallocation is by adapting system information

FIG. 6, Steps of a Method According to an Embodiment in Which Reallocation is by Adapting System Information FIG. 6 shows steps of a method of operation similar to that of FIG. 2 and corresponding reference numerals have been used as appropriate. An additional feature is that the reallocating comprises adapting system information for the capacity boost cell and broadcasting the adapted system information to user equipments. The system information has an indication of the reallocations between the operators. Such system information broadcast to UEs, is one way of enabling the reallocation to be made under the control of the network without needing a change in input from the user equipments. This also enables it to be implemented more efficiently and robustly than, for example having individual signalling to each user equipment. As shown at step 212, there is a step of reallocating automatically the capacity boost cell to the second operator sharing the same carrier, provided the first operator has authorised the reallocation, by adapting the system information broadcast to the UEs. It now includes an indication of the reallocation. This can by any kind of indication in any kind of coding or format in the system information. At step 222 there is a step of reallocating the capacity boost cell back to the first operator, in response to detecting an increase in the load on the first operator in the same area of coverage as the capacity boost cell, above a second threshold. This is done by adapting the system information broadcast to the UEs. Again it includes an indication of the reallocation. There are various ways of structuring this indication in the system information. Other additional features as described below can be combined with this embodiment.

Figure 7:
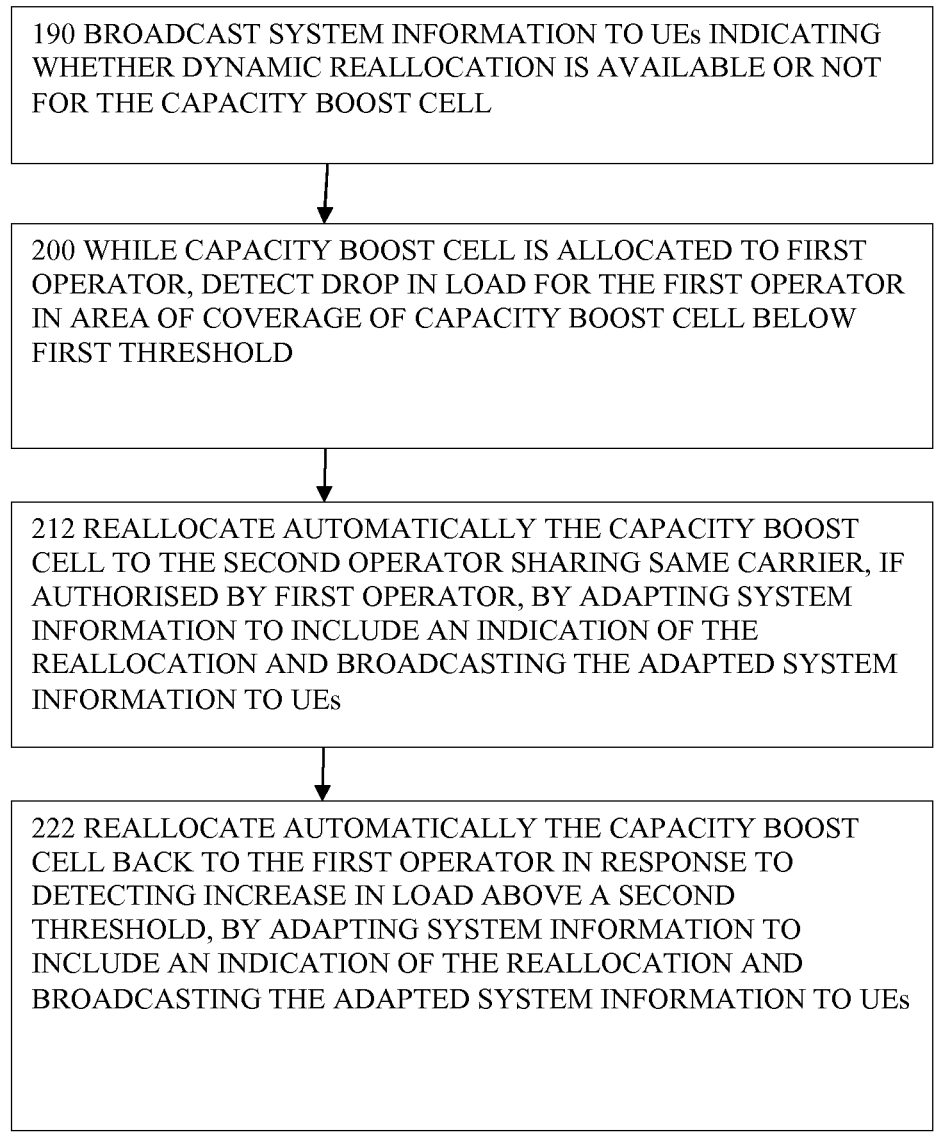
FIG. 7 shows steps of a method according to an embodiment in which the system information indicates whether dynamic reallocation is supported by the cell.

FIG. 7, Steps of a Method According to an Embodiment in Which the System Information Indicates Whether Dynamic Reallocation is Supported by the Cell FIG. 7 shows steps of a method of operation similar to that of FIG. 6 and corresponding reference numerals have been used as appropriate. An additional feature is that the system information includes an indication in the system information representing whether dynamic reallocation is available or not for that capacity boost cell, as shown by preliminary step 190. Making this indication explicit can make the system more robust, especially where a UE is likely to encounter a mixture of network infrastructures, some offering dynamic reallocation and some not, rather than leaving the UE to infer this information indirectly from omission of information for example. Other additional features as described below can be combined with this embodiment.

Figure 8:
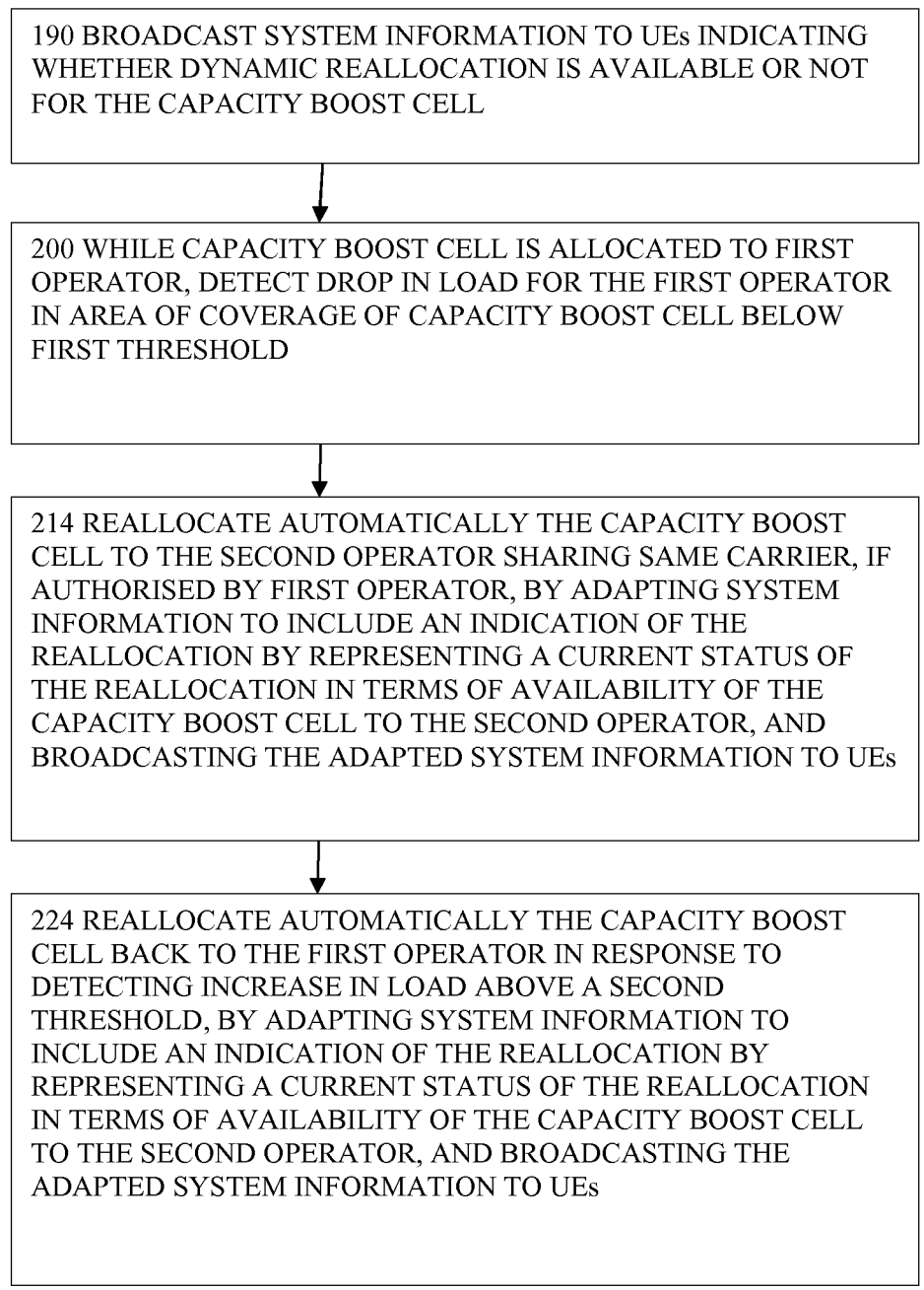
FIG. 8 shows steps of a method according to an embodiment in which the system information indicates current status of the reallocation

FIG. 8, Steps of a Method According to an Embodiment in Which the System Information Indicates Current Status of the Reallocation FIG. 8 shows steps of a method of operation similar to that of FIG. 6 and corresponding reference numerals have been used as appropriate. An additional feature is that the system information includes an indication in the system information representing a current status of the reallocation in terms of the availability of the capacity boost cell to UEs of the second operator. So at step 214, there is a step of reallocating automatically the capacity boost cell to the second operator sharing the same carrier, provided the first operator has authorised the reallocation, by adapting the system information broadcast to the UEs. It now includes an indication of the reallocation representing the current status of the reallocation. Again there are various ways this indication can be structured in the system information. At step 224, in response to detecting an increase in the load on the first operator in the same area of coverage as the capacity boost cell, above a second threshold, there is a step of reallocating the capacity boost cell back to the first operator. This is done by adapting the system information broadcast to the UEs. Again it includes an indication of the reallocation by representing a current status of the reallocation in terms of the availability of the capacity boost cell to the UEs of the second operator. There are various ways of structuring this indication in the system information, and the UEs need to be able to recognise whatever structure is chosen.

By having the indication in the system information representing a current status of the reallocation in terms of availability of the capacity boost cell to the second operator, this can help the UE to know whether and/or how it can use the capacity boost cell. Note that status can encompass a two state yes/no availability or a three state lock/softlock/unlock availability as will be described in more detail below or other variations. Other additional features as described below can be combined with this embodiment. For a home operator network, an example of the representation of this status can be the PLMN list in Master System Information Block being extended with following parameters per PLMN;

a. networkSharingType to indicate if network sharing is Fixed or Dynamic.

b. networkSharingStatus to indicate if network sharing is Unlocked/Softlocked/Locked where:

i. Unlocked—is to be interpreted by the UE as meaning the cell is available to a Secondary Operator PLMN, so the UEs of that operator can proceed with conventional signalling procedures to make use of some of the capacity of the cell.

ii. Softlocked—is to be interpreted by the UE as meaning the cell is locked to new connection establishment from Secondary network but ongoing calls from Secondary network can conclude during some or all of a transition period. This can be achieved by setting and monitoring a maximum allowed time timer, tCellSoftLockLimit.

iii. Locked—is to be interpreted by a UE of the secondary operator as meaning a cell is not available to a secondary operator for capacity offload.

Note that the setting of these parameters per PLMN in PLMN list of home operator can be controlled depending on the load of the primary operator on the cell in real time.

In the MIB of the system information there is a PLMN list of secondary operators and each has a network sharing status. Instead of having a locked status, an alternative would be to remove temporarily that secondary operator from the list. The UE of that operator would lose awareness of that capacity boost cell which has the same effect as it being in a locked state.

Figure 9:
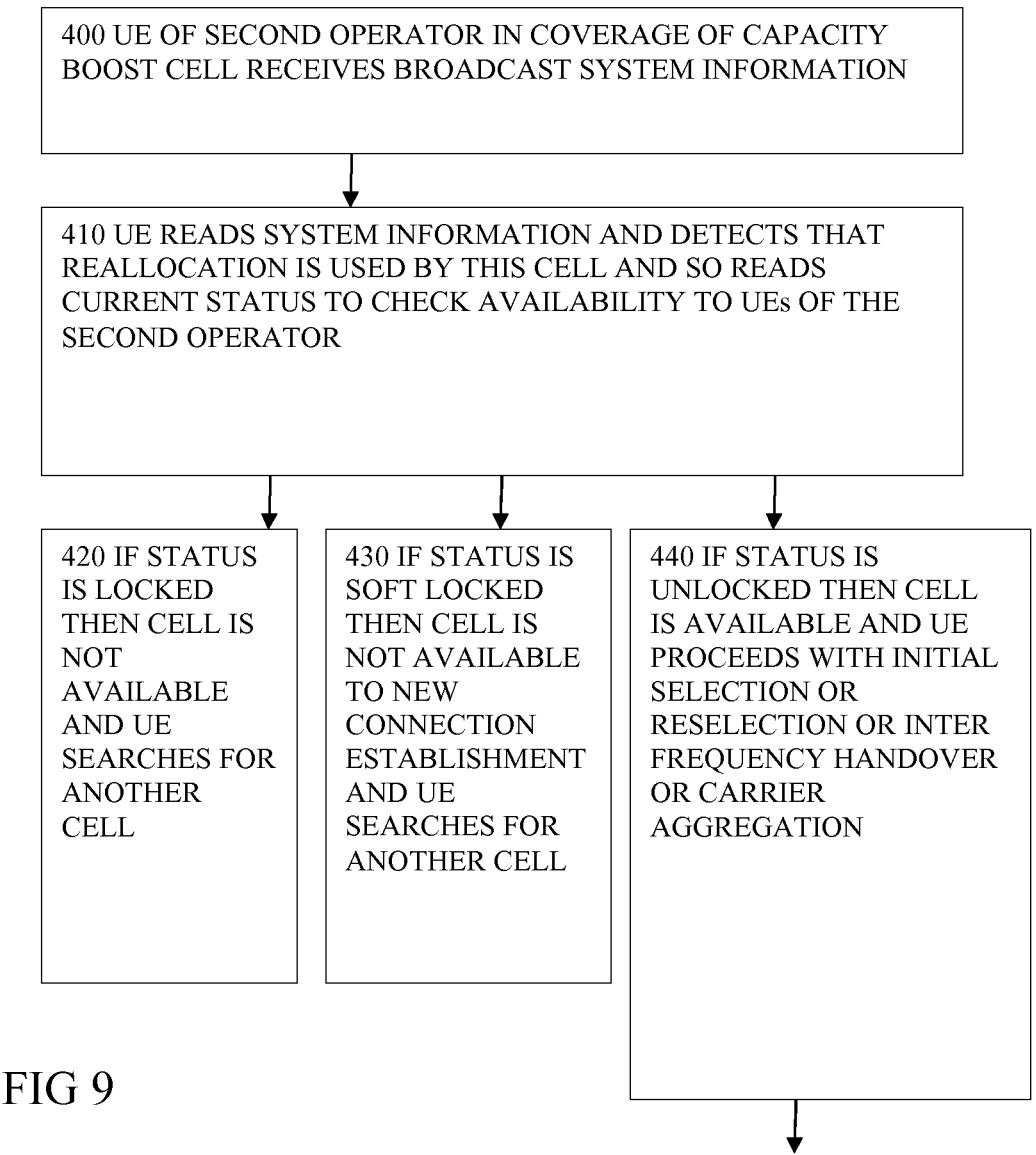
FIG. 9 shows steps of a method according to an embodiment showing steps by the UE.

FIG. 9, Steps of a Method According to an Embodiment Showing Steps by the UE FIG. 9 shows steps in the operation of a user equipment according to an embodiment. This shows an example of operating a user equipment with a cellular radio communications network having the apparatus for reallocation based on load, according to embodiments described above, when the user equipment is in the area of coverage of the capacity boost cell, and the user equipment is subscribed to the second operator. The method has a step 400 of receiving broadcast system information relating to the capacity boost cell, the system information having an indication of the status of availability of the capacity boost cell. There is also a step of determining whether to use the capacity boost cell based on detecting 410, 420, 440 from the received system information if the capacity boost cell is available to user equipments of the second operator, and based on detecting 430 from the received system information if the capacity boost cell is in a transition period when it can maintain existing connections but not establish new connections with user equipments of the second operator. Optionally as shown in step 410, the UE detects first whether the cell is of a type which uses dynamic reallocation, as a preliminary to detecting the current status to check availability of the cell to UEs of the second operator.

As shown in FIG. 9, at step 420 if the status is locked, the UE treats this as an indication that the cell is not available and the UE searches for another cell. At step 430, if the status is softlocked then the UE treats this as an indication that the cell is not available for new connection establishment but can be used to maintain an existing connection. As shown at step 440, if the status is unlocked, then the cell is available to the UEs of the second operator and the UE proceeds with initial selection or with reselection procedures, using conventional signaling protocols to be able to use at least part of the capacity of the cell. The UEs can implement these steps by having computer programs stored in memory circuits, for execution by processing circuits, following established practice, or by having any kind of modules integrated in any way for carrying out each step. Other additional features can be combined with this embodiment, and these UEs can be used with various embodiments of the network, provided the network can broadcast suitable system information.

Figure 10:
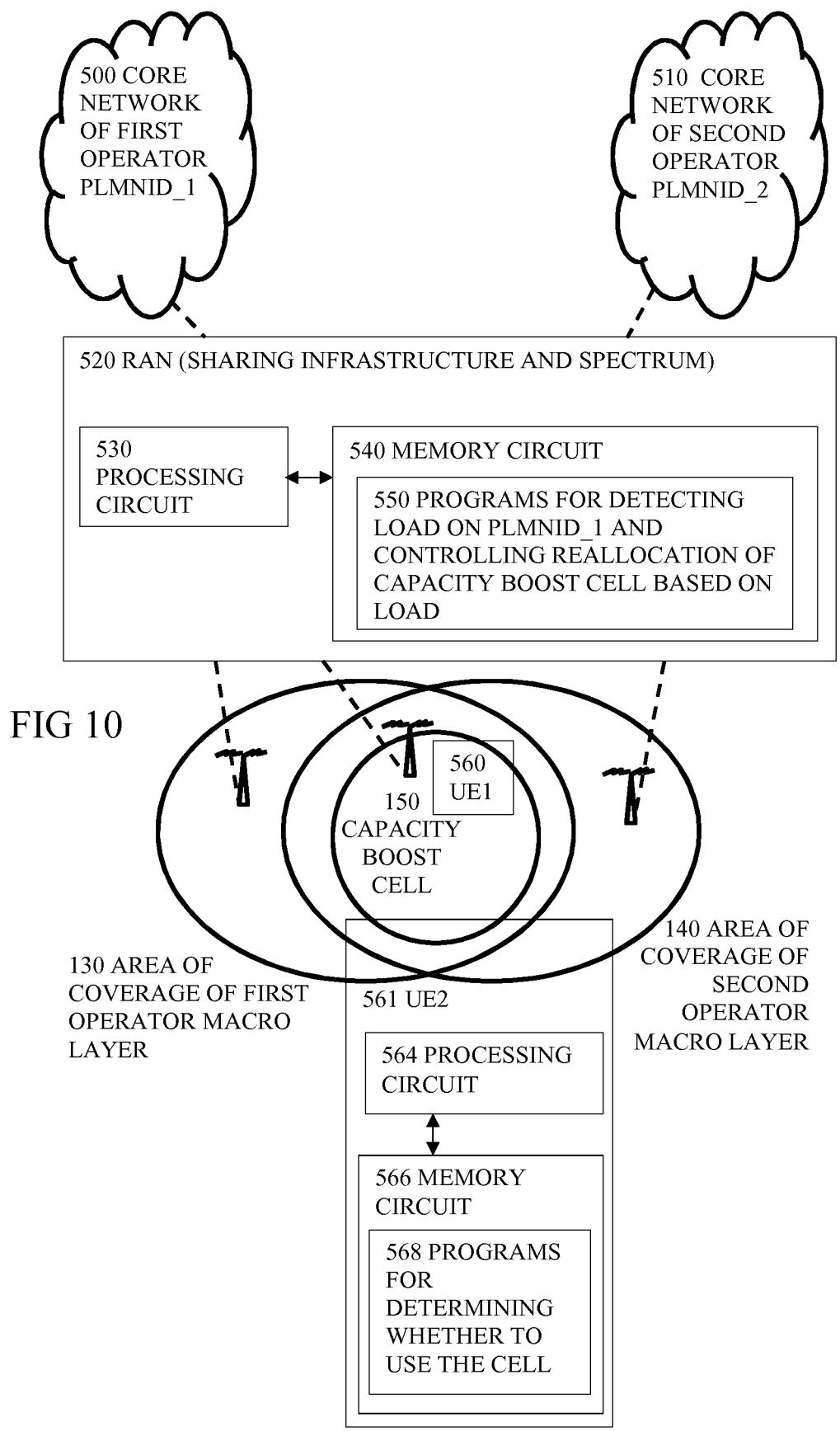
FIG. 10 shows a schematic view of apparatus according to an embodiment in which the RAN controls the reallocation.

FIG. 10, Schematic View of Apparatus According to an Embodiment in Which the RAN Controls the Reallocation FIG. 10 shows a schematic view similar to that of FIG. 1, and corresponding reference numerals have been used as appropriate. In this case the sharing infrastructure is shown as a Radio Access Network RAN 520, for sharing infrastructure and sharing the carrier, between the first and second operators. The first operator has a core network 500 having PLMN-ID 1 and the first operator has a core network 510 having PLMN-ID 2. The RAN typically has a number of nodes, and the apparatus for reallocating is shown here as a processing circuit 530 coupled to a memory circuit 540. The memory circuit is used to store programs 550 for carrying out the methods of reallocation described, to control the dynamic reallocation of the capacity boost cell based on load. There are two user equipments shown in this view, UE1, 560 subscribed to operator 1 and UE2, subscribed to operator 2. Some internal details are shown as an example of how to implement the user equipment functions. In UE2 are provided a processing circuit 564, and a memory circuit 566. The memory circuit 566 has programs for execution by the processing circuit to determine whether to use the cell based on the indication of reallocation in the system information received by the UE.

FIG. 11, Time Chart of Actions of RAN and UEs According to an Embodiment

FIG. 11 shows a time chart for actions of a RAN and of UEs according to embodiments. Time flows down the diagram, and the actions or steps of the RAN 520 are shown in boxes in the left column along a vertical dotted line, the actions or steps of a UE 560 of the first operator are shown in boxes in the central column and those of a UE 561 of the second operator are shown in boxes in the right hand column. Horizontal arrows between the columns indicate information broadcast from the RAN to the UEs. At step 630 the RAN broadcasts system information for the cell, which includes as shown by item 615, the primary and secondary PLMN_IDs, the indication that sharing is dynamic, and the indication that status=locked. This is read by UE 560 at step 620, and detecting the status is locked is interpreted as meaning the cell is available to the UE 560 of the first or primary operator. This is also read by UE 561 at step 630, and detecting the status is locked is interpreted as meaning the cell is not available to the UE 561 of the second or secondary operator.

At step 640, the RAN detects that the load on the capacity boost cell is below a first threshold and so the reallocation starts by the RAN forcing a handover of any connections remaining on the cell to force them to use other capacity, such as available capacity in a macro layer of the first operator. The reallocation then involves broadcasting amended system information indicating the status is now unlocked as shown by step 645. This is read by UE 560 at step 650 and causes it to hand over to the macro layer if it is currently connected to the capacity boost cell. At step 660, the UE 561 of the second operator reads that the status is now unlocked and this is interpreted as the cell now being available. Thus the UE 561 can proceed with conventional signalling to connect to the cell.

One way of detecting whether the load on the first/primary operator has reached the first threshold is to adapt the known cell power save technique (known as Traffic Aware power save for WCDMA and Small cell sleep mode for LTE), which is load dependent. Now instead of shutting down the radio resource in home network after off loading the residual low level of traffic to other neighbouring and overlapping cells, for a secondary operator or PLMN in the PLMN list and for a cell with a parameter setting of networkSharingType=Dynamic, the parameter networkSharingStatus is set to Unlocked so that the cell is made available to a second operator.

This cell will then appear to UEs as a neighbouring cell in the secondary operators network, making additional spectrum and radio resources available as additional capacity which can be used by conventional techniques of initial cell selection or reselection or handover or Carrier Aggregation. When the first operators network (e.g. RAN) detects that load is increasing in the relevant part of the network, as shown at step 670 (conventional triggers for sleeping cell wake-up can be applied here) and wishes to take back the temporarily allocated spectrum the reallocation with transition period can take place by broadcasting an amended system information shown at step 675. For PLMN's in the PLMN list with parameter setting of networkSharingType=Dynamic, then the system information is adapted by changing parameter networkSharingStatus from Unlocked to Softlocked.

At step 680 the UE 560 reads that the status is soft locked and so does not connect yet to this cell. At step 690 the UE of the second operator reads the status as softlocked and so keeps existing connections but does not establish any new connections.

When all calls in secondary network are completed or expiry timer elapses, the transition period is over and at step 700 the RAN forces handover of any remaining PLMN_ID2 traffic onto its macro layer and broadcasts amended system information 705 with parameter networkSharingStatus set to Locked for the cell. This is read by UE 560 at step 710 and understood as meaning the cell is available and so the UE can connect to make use of the capacity of the cell. At step 720 it is read by UE 561 of the second operator as meaning that if still connected it must handover to the macro layer and not start any new connection. The end of the transition period may be indicated by expiry of a timer tCellSoftLock-Limit, which can trigger a forced handover moving all remaining connections back to the secondary network. Other ways of providing a transition period with a graduated reallocation back to the first operator can be envisaged.

FIG. 12, Apparatus Having Modules for Reallocation According to an Embodiment FIG. 12 shows a schematic view similar to that of FIG. 1, and corresponding reference numerals have been used as appropriate. In this case the sharing infrastructure is shown as a Radio Access Network RAN 520, for sharing infrastructure and sharing the carrier, between the first and second operators. The first operator has a core network 500 having PLMN-ID 1 and the first operator has a core network 510 having PLMN-ID 2. The RAN typically has a number of nodes, and in the apparatus for reallocating is shown here as modules which may be implemented with any kind of circuitry and integrated in any way, for carrying out the control of the reallocation. Module 555 is shown for detecting a drop in load below a first threshold on the first operator in the area of coverage of the capacity boost cell. Module 557 is shown for reallocation of the capacity boost cell to the second operator based on the detected drop in load. Module 559 is shown for responding to a detected increase in load on the first operator above a second threshold, by reallocating the capacity boost cell back to the first operator. The modules can comprise for example hardware or software, processing circuits and associated memory, or other types of circuitry, and can be integrated to any amount, and boundaries between modules or how different functions are divided or combined into modules can be varied.

Concluding Remarks

As has been described, some embodiments show how during periods of low load at cell level, an operator can choose to make available spectrum & infrastructure to a defined prioritized list of PLMN's (Secondary Operators) operating in same coverage area based on the current load in the primary/home operators network on cell level.

This flexibility can be network controlled via system information broadcast to the UEs. Secondary Operators can pay a Primary operator for;

Access to additional network capacity

Payload transferred

The option of having a soft-locking mechanism during a transition period can help ensure the primary operator remains in control of the shared resource while providing a subscriber using the shared resource with a reduced risk of service being compromised during a period when access to the shared resource is in transition from secondary operator to primary operator.

Operators who have invested in spectrum and infrastructure to address peak demands of their subscriber base can now increase their ROI by dynamically allocating idle resources to operators operating in same coverage area during periods of low load on a per cell basis (Network Operator offering Dynamic Virtual Network Sharing, different PLMN_id(s)).

Existing Virtual Operators who do not want or need to invest in spectrum and infrastructure can bring an additional new service offering to the market (Virtual Network Operator+Dynamic Virtual Network Operator, same PLMN_id).

New Virtual Operators who do not want or need to invest in spectrum and infrastructure can bring a new service offering to the market (Dynamic Virtual Network Operator). This is "temporary hotspot like" deployment.

Operators who do not want to put additional investment in spectrum and infrastructure to boost their existing offering (Network Operator+Dynamic Virtual Network Operator, same PLMN_id). With the emergence of new deployments of technologies such as SDN, virtualisation and network slicing, operators will be able to create optimised deployments for particular business needs. This will tend to increase the value of having dynamic reallocation of capacity boost cells.

The invention claimed is:

1. A method of reallocating a capacity boost cell between first and second operators in a cellular radio communications network, the first and second operators having respective areas of coverage sharing same carrier and overlapping with a coverage of the capacity boost cell, the method having steps of:

while the capacity boost cell is allocated to the first operator, detecting a drop in load for the first operator, in an area of the the coverage of the capacity boost cell, below a first threshold, reallocating automatically the capacity boost cell to the second operator in response to the detected drop in the load, reallocating automatically the capacity boost cell, from the second operator, to the first operator in response to detecting a subsequent increase in the load above a second threshold for the first operator in an area of coverage overlapping with the area of the coverage of the capacity boost cell, wherein the step of reallocating to the first operator comprises a transition period when new requests for resources of the capacity boost cell from user equipments of the second operator are not allowed, and resources already in use by the user equipments of the second operator are allowed to remain in use, and forcing some of the resources already in use during the transition period to be relinquished before the end of the transition period.

2. The method of claim 1, wherein the first operator comprises a primary operator having control of the reallocation, and wherein the reallocation is carried out without seeking authorization from another operator.

3. The method of claim 1, wherein the steps of reallocating comprise adapting system information for the capacity boost cell to comprise an indication of the reallocations between the first and second operators and broadcasting the adapted system information to user equipments.

4. The method of claim 3, wherein the indication in the system information represents whether dynamic reallocation is available or not for the capacity boost cell.

5. The method of claim 3, wherein the indication in the system information represents a current status of the reallocation in terms of availability of the capacity boost cell to the second operator.

6. The method of claim 1, wherein the method is carried out at a radio access network.

7. A non-transitory computer readable medium comprising a computer program configured to perform, when run on a computer, a method of reallocating a capacity boost cell between first and second operators in a cellular radio communications network, the first and second operators having respective areas of coverage sharing same carrier and overlapping with a coverage of the capacity boost cell, the method having steps of:

while the capacity boost cell is allocated to the first operator, detecting a drop in load for the first operator, in an area of the coverage of the capacity boost cell, below a first threshold, reallocating automatically the capacity boost cell to the second operator in response to the detected drop in the load, reallocating automatically the capacity boost cell, from the second operator, to the first operator in response to detecting a subsequent increase in the load above a second threshold for the first operator in an area of coverage overlapping with the area of the coverage of the capacity boost cell, wherein the step of reallocating to the first operator comprises a transition period when new requests for resources of the capacity boost cell from user equipments of the second operator are not allowed, and resources already in use by the user equipments of the second operator are allowed to remain in use, and forcing some of the resources already in use during the transition period to be relinquished before the end of the transition period.

8. An apparatus for reallocating a capacity boost cell between first and second operators in a cellular radio communications network, the first and second operators having respective areas of coverage sharing same carrier and overlapping with a coverage of the capacity boost cell, the apparatus having a processing circuit and a memory circuit, the memory circuit having instructions executable by the processing circuit, wherein the processing circuit, when executing the instructions, is configured to:
while the capacity boost cell is allocated to the first operator, detect a drop in load for the first operator, in an area of the coverage of the capacity boost cell, below a first threshold,
reallocate automatically the capacity boost cell to the second operator in response to the detected drop in the load,
reallocate automatically the capacity boost cell, from the second operator, to the first operator in response to detection of a subsequent increase in the load above a second threshold for the first operator in an area of coverage overlapping with the area of the coverage of the capacity boost cell, wherein the reallocation to the first operator comprises a transition period when new requests for resources of the capacity boost cell from user equipments of the second operator are not allowed, and resources already in use by the user equipments of the second operator are allowed to remain in use, and
force some of the resources already in use during the transition period to be relinquished before the end of the transition period.

9. The apparatus of claim 8, wherein the first operator comprises a primary operator having control of the reallocation, and wherein the processing circuit is configured to carry out the reallocation under the control of the primary operator without seeking authorization from another operator.

10. The apparatus of claim 8, wherein the processing circuit is configured to carry out the reallocation by adapting system information for the capacity boost cell to comprise an indication of the reallocations between the first and second operators and to broadcast the adapted system information to user equipments.

11. The apparatus of claim 10, wherein the processing circuit is configured to adapt the indication in the system information to represent whether dynamic reallocation is available or not for the capacity boost cell.

12. The apparatus of claim 10, wherein the processing circuit is configured to adapt the indication in the system information to represent a current status of the reallocation in terms of availability of the capacity boost cell to the second operator.

13. A radio access network node having the apparatus of claim 8.

14. A method of operating a user equipment with a cellular radio communications network having an apparatus, when the user equipment is in an area of coverage of a capacity boost cell, and the user equipment is subscribed to a second operator, wherein the apparatus is for reallocating the capacity boost cell between a first operator and the second operator in the cellular radio communications network, the first and second operators having respective areas of coverage sharing same carrier and overlapping with the coverage of the capacity boost cell, wherein the apparatus comprises a processing circuit and a memory circuit, the memory circuit having instructions executable by the processing circuit, and wherein the processing circuit, when executing the instructions, is configured to:
while the capacity boost cell is allocated to the first operator, detect a drop in load for the first operator, in the area of the coverage of the capacity boost cell, below a first threshold,
reallocate automatically the capacity boost cell to the second operator in response to the detected drop in the load,
reallocate automatically the capacity boost cell, from the second operator, to the first operator in response to detecting a subsequent increase in the load above a second threshold for the first operator in an area of coverage overlapping with the area of the coverage of the capacity boost cell, wherein the reallocation to the first operator comprises a transition period when new requests for resources of the capacity boost cell from user equipments of the second operator are not allowed, and resources already in use by the user equipments of the second operator are allowed to remain in use, and
force some of the resources already in use during the transition period to be relinquished before the end of the transition period,
the method having steps of:
receiving broadcast system information relating to the capacity boost cell, the broadcast system information having an indication of a status of availability of the capacity boost cell, and
determining whether to use the capacity boost cell based on detecting from the received broadcast system information when the capacity boost cell is available to the user equipments of the second operator, and based on detecting from the received broadcast system information when the capacity boost cell is in the transition period.

15. A non-transitory computer readable storage medium comprising a computer program configured to, when run on a computer, perform a method of operating a user equipment with a cellular radio communications network having an apparatus, when the user equipment is in an area of a coverage of a capacity boost cell, and the user equipment is subscribed to a second operator, wherein the apparatus is for reallocating the capacity boost cell between a first operator and the second operator in the cellular radio communications network, the first and second operators having respective areas of coverage sharing same carrier and overlapping with the coverage of the capacity boost cell, wherein the apparatus comprises a processing circuit and a memory circuit, the memory circuit having instructions executable by the processing circuit, and wherein the processing circuit, when executing the instructions, is configured to:
while the capacity boost cell is allocated to the first operator, detect a drop in load for the first operator, in the area of the coverage of the capacity boost cell, below a first threshold,
reallocate automatically the capacity boost cell to the second operator in response to the detected drop in the load,
reallocate automatically the capacity boost cell, from the second operator, to the first operator in response to detecting a subsequent increase in the load above a second threshold for the first operator in an area of coverage overlapping with the area of the coverage of the capacity boost cell, wherein the reallocation to the first operator comprises a transition period when new requests for resources of the capacity boost cell from user equipments of the second operator are not allowed, and resources already in use by the user equipments of the second operator are allowed to remain in use, and force some of the resources already in use during the transition period to be relinquished before the end of the transition period, the method having steps of:

receiving broadcast system information relating to the capacity boost cell, the broadcast system information having an indication of a status of availability of the capacity boost cell, and determining whether to use the capacity boost cell based on detecting from the received broadcast system information when the capacity boost cell is available to the user equipments of the second operator, and based on detecting from the received broadcast system information when the capacity boost cell is in the transition period.

16. A user equipment suitable for operation with a cellular radio communications network having an apparatus for reallocating a capacity boost cell between first and second operators in the cellular radio communications network, the first and second operators having respective areas of coverage sharing same carrier and overlapping with a coverage of the capacity boost cell, the apparatus having a processing circuit and a memory circuit, the memory circuit having instructions executable by the processing circuit, wherein the processing circuit, when executing the instructions, is configured to:

while the capacity boost cell is allocated to the first operator, detect a drop in load for the first operator, in an area of the coverage of the capacity boost cell, below a first threshold, reallocate automatically the capacity boost cell to the second operator in response to the detected drop in the load, reallocate automatically the capacity boost cell, from the second operator, to the first operator in response to detecting a subsequent increase in the load above a second threshold for the first operator in an area of coverage overlapping with the area of the coverage of the capacity boost cell, wherein the reallocation to the first operator comprises a transition period when new requests for resources of the capacity boost cell from user equipments of the second operator are not allowed, and resources already in use by the user equipments of the second operator are allowed to remain in use, and force some of the resources already in use during the transition period to be relinquished before the end of the transition period, and wherein the user equipment comprises:

a processing circuit; and a memory circuit, the memory circuit having instructions executable by the processing circuit, wherein the processing circuit, when executing the instructions, is configured to:

receive broadcast system information relating to the capacity boost cell, the broadcast system information having an indication of a status of availability of the capacity boost cell, and determine whether to use the capacity boost cell based on detecting from the received broadcast system information when the capacity boost cell is available to the user equipments of the second operator, and based on detecting from the received broadcast system information when the capacity boost cell is in the transition period.

* * * * *